United States Patent [19]

Brunson et al.

[11] Patent Number: 5,760,823
[45] Date of Patent: Jun. 2, 1998

[54] VIDEO MESSAGING ARRANGEMENT

[75] Inventors: Gordon Richards Brunson. Broomfield; Robert Michael Klein. Denver, both of Colo.

[73] Assignee: Lucent Technologies Inc., Murray Hill, N.J.

[21] Appl. No.: 522,647

[22] Filed: Sep. 1, 1995

[51] Int. Cl.$^6$ .................................................. H04M 11/00
[52] U.S. Cl. ............................... 348/14; 348/17; 379/67; 379/93.24
[58] Field of Search ....................... 348/14–17; 379/67, 379/68, 70, 74, 88, 89, 90.01, 93.01, 93.02, 93.05, 93.07, 93.14, 93.24, 100.08, 201, 210, 211, 212, 214; 370/259, 260

[56] References Cited

U.S. PATENT DOCUMENTS

| | | | |
|---|---|---|---|
| 4,555,781 | 11/1985 | Baldry et al. | 370/60 |
| 5,189,691 | 2/1993 | Dunlap | 379/70 |
| 5,345,258 | 9/1994 | Matsubara et al. | 348/14 |
| 5,374,952 | 12/1994 | Flohr | 348/12 |
| 5,375,068 | 12/1994 | Palmer et al. | 364/514 |

FOREIGN PATENT DOCUMENTS 9214314  8/1992  WIPO .......................... H04J 3/00

OTHER PUBLICATIONS

N. Leavitt, *Trends In Desktop Videoconferencing*. Enterprise Communications. Apr. 1995, vol. 7, No. 4, pp. 1–26, 28–31.
Computer Telephony, Unified Messaging. vol. 2, Issue 7, Jul. 1995, pp. 47–55, 60, 62–68, 72–76.
Brochure: *Digital Video Lands On The Desktop*. InSoft®–InfoFlash. pp. 1–2.
Brochure: *Turn your Desktop into A Global Conference Room*. InSoft, pp. 1–2.
Brochure: *Collaborative Features that Make the Difference*. InSoft, pp. 1–2.
Brochure: InSoft. Bringing Your Whole World Together On the Network, pp. 1–2.
Brochure: *InSoft Shared Application Resource Environment–Share*. pp. 1–2.
Brochure: *InSoft Network Television, INTV™!*. InSoft, pp. 1–2.
Brochure: *InSoft Open DVE™*. InSoft, pp. 1–2.
Brochure: *InSoft Digital Video Everywhere, DVE™*. InSoft, pp. 1–2.
Brochure: *Lotus SCREENCAM, Release 1* instructions, pp. 1–4.
Brochure: *AT&T Intuity™ Voice Processing Solutions*. 12 pages.
Brochure: AT&T. The AT&T Intuity™ Audix® Voice Messaging System, 4 pages.
Brochure: *AT&T The AT&T Intuity™ System Message Manager*, 4 pages.

Primary Examiner—Curtis Kuntz
Assistant Examiner—Stephen W. Palan
Attorney, Agent, or Firm—David Volejnicek

[57] ABSTRACT

Video and telephony messaging are integrated by a telephony multi-media messaging system (101) connected to a plurality of video workstations (103–104) by a LAN or WAN (100). The workstations are connected to ISDN telephone lines (153–154). The workstations answer video calls on the video lines and/or on the LAN or WAN that go unanswered by users, record video messages from the video calls, and send the video messages via the LAN or WAN to the messaging system for storage. They also retrieve stored video messages via the LAN or WAN from the messaging system and play them to users. The messaging system stores both video and non-video messages and has a telephony user interface (114–115 and 118) for storing and retrieving non-video messages and for accessing non-video portions of all messages. The video terminals perform functions, such as answering of video calls and recording of video messages, on behalf of the telephony messaging system which cannot itself perform those functions, while the messaging system performs functions, such as providing a rich set of messaging features and providing telephony access from a variety of different telephony terminals to at least portions of the video messages, on behalf of the video terminals which cannot themselves perform those functions.

12 Claims, 9 Drawing Sheets

VIDEO MESSAGING ARRANGEMENT

TECHNICAL FIELD

This invention relates to telecommunications messaging systems.

BACKGROUND OF THE INVENTION

Single-media and multi-media messaging, wherein users create and send or leave voice, binary data, fax, etc. messages for recipients to or in the recipients' mailboxes in the telephone network, are well known in the art. The addition of video as a messaging medium to the existing messaging media creates certain difficulties, however. For purposes of this discussion, video communications include moving pictures, moving pictures with synchronized audio, shared whiteboard, shared applications, or any other communications that include moving images. The difficulties do not arise within the messaging systems themselves—multi-media messaging systems are often internally capable of handling video objects (that is, portions or components of the message that are represented in the video medium) as a direct extension of the manner in which they handle any one or more of the voice objects, binary data objects, fax objects, etc. Rather, the difficulties arise in the interfaces to the messaging systems. Firstly, while video messages and multi-media messages that include video components may be transmitted through telephone networks as video calls, many telephone switching systems do not have the capability of redirecting video calls to coverage. They therefore lack the ability to redirect video calls from their original intended destinations to messaging systems. This prevents the messaging systems from serving one of their principal functions, which is to provide coverage for calls that go unanswered at their destinations. And secondly, even if the switching systems are able to redirect video calls, most existing messaging systems lack the special port circuits that are needed to receive video calls and to play out recorded video messages through the telephone system. Hence, adapting of existing messaging systems to make them capable of serving video messages generally requires extensive and expensive redesign of their telephony interfaces.

Local area networks (LANs) and wide area networks (WANs) often provide the capability of transporting files of video information between workstations, and between workstations and network servers, that are connected to the networks, in substantially the same manner as they provide for the exchange of electronic mail (e-mail) messages. While there are substantially no difficulties that arise in these systems as a consequence of the messages including video objects, these systems have inherent limitations that do not make them suitable substitutes for telephony-based messaging systems. First, most of the LAN-based or WAN-based messaging systems also lack message redirection capability. Second, they provide access to messages exclusively through video terminals, as opposed to telephony-based integrated multi-media messaging systems that normally provide access to messages (or at least to message headers and a subset of the media objects of the message) through a variety of terminals, such as PCs, fax machines, telephones, data terminals, etc. And third, they are typically feature-poor, relative to the telephony-based messaging systems, in terms of the number and types of features that they offer to users for creating, retrieving, sending, and receiving of messages. Therefore, extending the capabilities of the LAN- and WAN-based messaging systems to match the capabilities of telephony-based messaging system would be an extensive and an expensive development effort.

SUMMARY OF THE INVENTION

This invention is directed to solving these and other problems and disadvantages of the prior art. According to an implementation of the invention, a video terminal is employed to perform functions, such as answering of video calls and recording of video messages, on behalf of a telephony messaging system which cannot itself perform those functions, while the telephone messaging system is employed to perform functions, such as providing a rich set of messaging features and providing telephony access from a variety of different types of telephony terminals to at least portions of the video messages, on behalf of the video terminals which cannot themselves perform those functions. This implementation of the invention interfaces video terminals by means of a LAN or a WAN to a telephony multi-media messaging system to provide the telephony messaging system with the ability to receive and transmit video messages, and conversely the telephony multi-media messaging system provides the features and capabilities of conventional telephony-based messaging systems to video messages conveyed via the LAN or WAN. Consequently, the telephony messaging system is made capable of serving video messages without extensive and expensive redesign of its telephony interface, and the messaging capabilities and features of telephony-based messaging systems are extended to LAN-and WAN-based messaging without extensive and expensive development effort. Video messaging and telephony multi-media messaging are thus integrated with a minimum of effort and cost. The result, from the users' viewpoint, is a universal mailbox: one location for accessing all messages regardless of what network delivered the messages, what media the messages are represented in, and what instruments or mechanisms are used to access the messages. This is a significant improvement over conventional messaging arrangements that typically use separate delivery, storage, and access mechanisms for at least video messages and messages represented in other media types.

Figure 2:
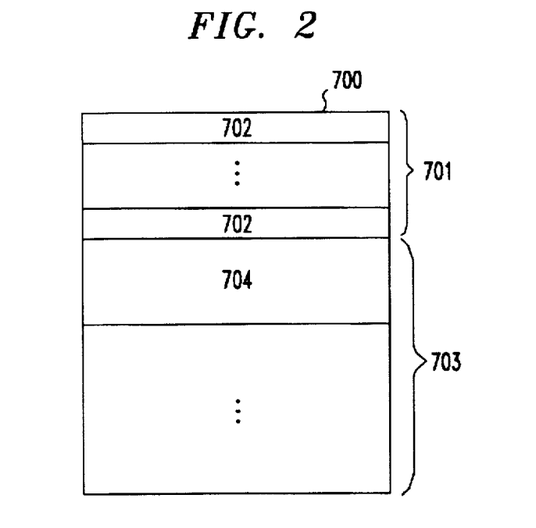
FIG. 2 is a block diagram of a multi-media message of the system of FIG. 1.

Generally according to the invention, a video messaging system is configured as follows. A multi-media message server is connected to both a LAN or a WAN (or some other video communications network) and at least one telephone line. The multi-media message server (such as a telephony multi-media messaging system, for example) stores messages that have a plurality of message portions, and at least some of those message portions may be represented in any one of a plurality of different media, including a video medium. (An illustrative structure of such a message is shown in FIG. 2.) In other words, the multi-media message server can handle video objects. The multi-media message server has a first interface connected to the at least one telephone line for providing access over the at least one telephone line to at least some portions of the messages stored in the multi-media message server. This is illustratively the conventional telephony messaging interface. The multi-media message server has a second interface connected to the video communications local area or wide area network for receiving video messages (i.e., messages having portions represented in the video medium) via the video communications network and storing them in the multi-media message server, and also for retrieving the stored video messages and transmitting them via the video communications network. Furthermore, one or more video communications terminals are connected to the video communications network. The video communications terminals are, for example, video workstations. At least a first one of the video communications terminals handles video communications incoming to the first terminal and which an intended recipient of the video communications has not answered (illustratively, either at the first terminal itself, or at another video terminal from which the video communication has been forwarded). Illustratively, an unanswered incoming video communication may be incoming to the first terminal either via the video communications network (for example, from one of the other video communications terminals), or via a video communications line, such as an ISDN telephone line, that is connected to the first terminal (for example, from some remote video caller). The first terminal includes means for answering the incoming video communication and recording a video message component from the video communication. The first terminal further includes means responsive to the recording, for transmitting the recorded video message via the video communications network to the multi-media message server, and causing the second interface of the multi-media message server to receive and store the transmitted video message in the multi-media message server. (This is illustratively the call-answer scenario shown in FIG. 3.) At least a second one of the video communications terminals includes means for causing the second interface of the multi-media message server to retrieve and transmit the stored video message, and for receiving the video message transmitted from the multi-media message server via the video communications network for presentation of the received video message to a user of the second terminal. (This is illustratively the message-retrieval scenario shown in FIG. 4.) The first and second terminals may be different terminals, or they may be the same terminal. Preferably, one or more of the video communications terminals include means for a user of the terminal to create a video message on the terminal, sending the created message via the video communications network to the multi-media message server, and causing the second interface of the multi-media message server to receive and store the sent message in one or more mailboxes in the multi-media message server. (This is illustratively the mail-message scenario shown in FIG. 5.)

A message server and a video communications terminal for use in such a video messaging system are also characterized.

A video messaging system configured in the manner characterized above may advantageously be constructed from substantially conventional elements or may be retrofitted into conventional messaging infrastructure without extensive redesign or modification of the elements or infrastructure. This allows video messaging having telephony-like messaging features and capabilities to be implemented with minimal effort and at low cost.

These and other advantages and features of the invention will become more apparent from the following description of an illustrative embodiment of the invention taken together with the drawing.

DETAILED DESCRIPTION

Figure 1:
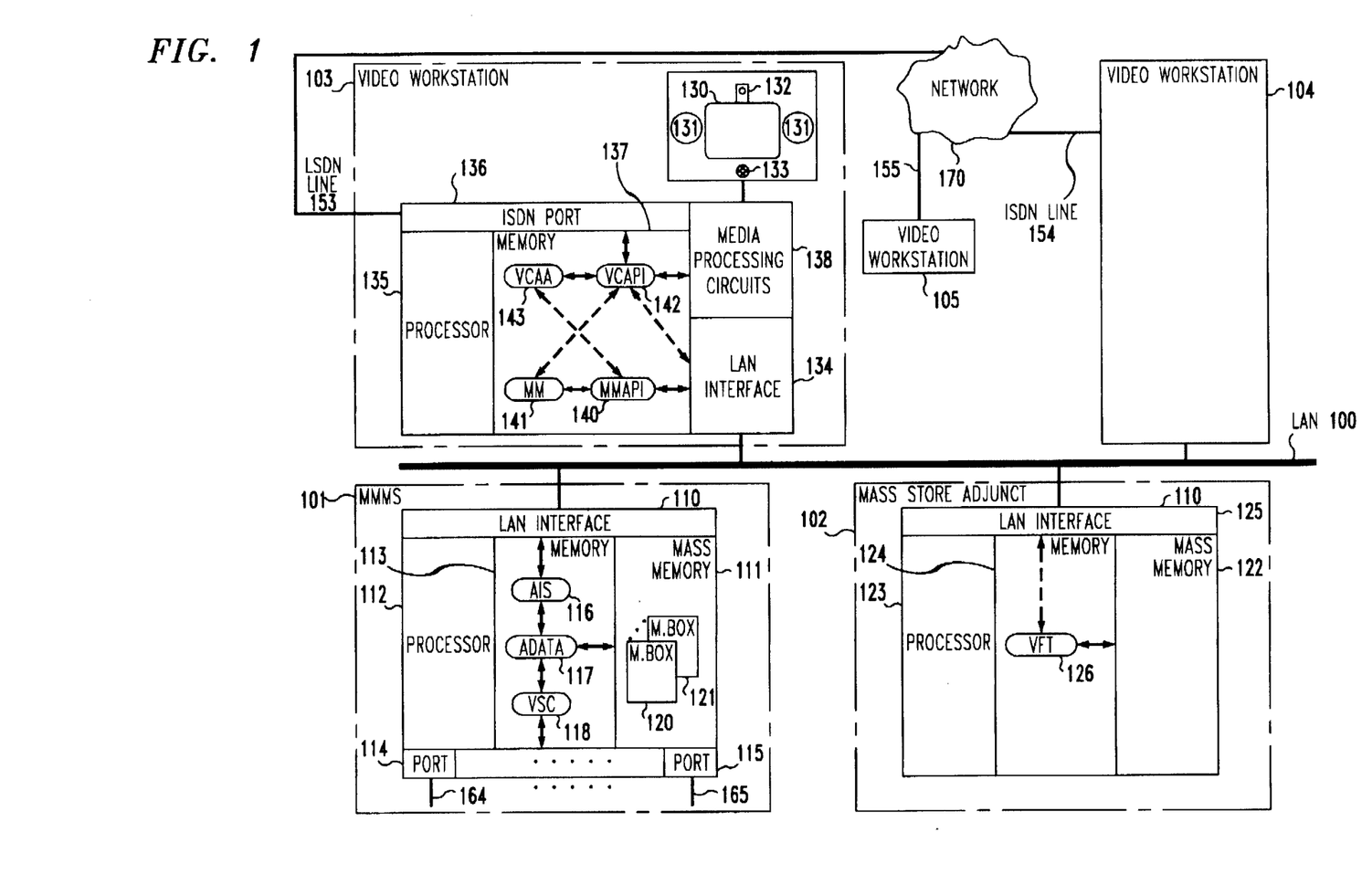
FIG. 1 is a block diagram of a telecommunications system which includes a first illustrative embodiment of the invention.

FIG. 1 shows a block diagram of an illustrative telecommunications system constructed according to the principles of the invention. In keeping with the objective of the invention to avoid extensive redesign or modification of existing infrastructure, all of the system hardware is conventional. The invention lies in this illustrative embodiment in the interconnection of the hardware and in video-handling enhancements to their conventional software.

The system of FIG. 1 includes one or more video communications workstations 103–105. These are, illustratively, the AT&T Vistium® station, the Intel Proshare station, or a conventional UNIX® operating system workstation equipped with the Insoft Communique! software and video processing boards. Each station 103–104 includes a video display screen 130, a video camera 132, loudspeakers 131, and a microphone 133. These are connected to media processing circuits 138, which are illustratively implemented as digital signal processors (DSPs). An integrated services digital network (ISDN) port 136 couples each video workstation 103–105 to a respective one of telephone ISDN lines 153–155. ISDN lines 153–155 connect the video workstations 103–104 to a network 170—such as the public telephone network, a private telephone network, or some other network—for purposes of transmitting and receiving telecommunications, including video communications. The video workstation further includes a general-purpose processor 135, and a memory 137 that stores programs for execution and data for use by processor 135. A local area network (LAN) interface 134 connects at least some video workstations 103–104 to a LAN 100, or alternatively to a wide area network (WAN). Video workstations 103–104 can communicate with each other over LAN 100, including placing video calls to each other over LAN 100. LAN 100 illustratively implements the terminal control protocol/ internet protocol (TCP/IP).

The system of FIG. I further includes a multi-media messaging system 101. Messaging system 101 is illustratively either the AT&T Intuity® system or the AT&T Definity® Audix® system. These systems structure a multi-media message 700 in the manner shown in FIG. 2. Message 700 has a message header component 701 that comprises a plurality of header elements 702. Each element 702 provides some information about the message, such as who it is for, who it is from, whether it is a private or a priority message, and what message-body components it contains. Message 700 further has a message body 703 that contains one or more message-body components 704 each expressed in a different medium. Supported media include voice, text, fax, binary data, and video. The video component of the message can contain moving pictures, moving pictures with synchronized audio, shared whiteboard, shared applications, or any other communications that include moving images. Mesagebody components 704 are communications that include moving images. Message-body components 704 are usually separate files that are linked to message header component 701 by pointers.

Returning to FIG. 1, messaging system 101 includes a mass memory 111 that implements a plurality of message mailboxes 120-121 for messaging service subscribers, at least some of whom are also users/owners of video workstations 103-104. Messaging system 101 further includes a processor 112, and a memory 113 that stores programs for execution and data for use by processor 112. A plurality of DSP-based voice and Touch-Tone ports 114-115 couple system 101 to a plurality of telephone lines 164-165 by means of which callers and subscribers can access messaging system 101 in the conventional manner. A LAN interface 110 connects messaging system 101 to LAN 100.

The system of FIG. 1 also preferably includes an adjunct mass store 102. Mass store 102 is illustratively a disk-storage system controlled by the UNIX® operating system. It functions as an adjunct to messaging system 101 to extend the capacity of mass memory 111. Conventional network file system (NFS) connectivity between messaging system 101 and mass store 102 turns mass memory 122 into an extension of mass memory 111. Mass store 102 includes a mass memory 122, a processor 123, a memory 124 that stores programs for execution and data for use by processor 123, and a LAN interface 125 that connects mass store 102 to LAN 100.

The software of messaging system 101 includes a voice session controller (VSC) 118 that implements a conventional Touch-Tone user interface to messaging system 101 over telephone lines 164-165. The software also includes an application database (ADATA) 117, which is a database mechanism that implements a messaging database, including mailboxes 120 and 121. ADATA 117 includes video as one of its defined message media objects, along with audio, fax, binary data, and any other media objects that are defined for messaging system 101. The software of messaging system 101 further includes an application interaction server (AIS) 116, which functions as a TCP/IP remote procedure call (RPC) server for communications over LAN 100 to and from messaging system 101.

The software of adjunct mass store 102 includes a video file transfer process (VFT) 126. VFT 126 communicates with AIS program 116 over LAN 100 and responds to its requests to either accept video files from messaging system 101 for storage in mass memory 122 or retrieve stored video files from mass memory 122 for return to messaging system 101.

The software of video workstations 103-104 includes a multi-media messaging application program interface (MMAPI) 140, which implements communications between the video workstations and AIS 116 of messaging system 101. Communications between MMAPI 140 and messaging system 101 are implemented as TCP/IP RPCs using the conventional client/server request/response model of interaction. MMAPI 140 includes video file transfer among its file transfer capabilities, along with audio file transfer, binary data file transfer, and file transfer capability of any other desired media. If messaging system 101 is the Intuity system or the Definity Audix system, MMAPI 140 is preferably a version of the AT&T Intuity MAPI (IMAPI) or AT&T Audix MAPI (AMAPI). The IMAPI or AMAPI is a TCP/IP RPC implementation which supports access to the Intuity or Audix system from client application processes that are interconnected with the Intuity or Audix system by a LAN or a WAN. The IMAPI or AMAPI interface is specified as a set of C-language function calls, either in a standard UNIX system archive or library on UNIX® operating system client machines, or in a Dynamic Link Library (DLL) on Windows® or OS/2® operating system client machines.

The software of video workstations 103-104 also includes a message manager (MM) 141 that implements a graphical user interface (GUI) for a user of video workstation 132 to messaging system 101. Like ADATA 117 of messaging system 101, MM 141 includes video as one of its defined message media objects. If messaging system 101 is the Intuity system or the Definity Audix system, MM 141 is preferably a version of the AT&T Intuity Message Manager application.

Figure 11:
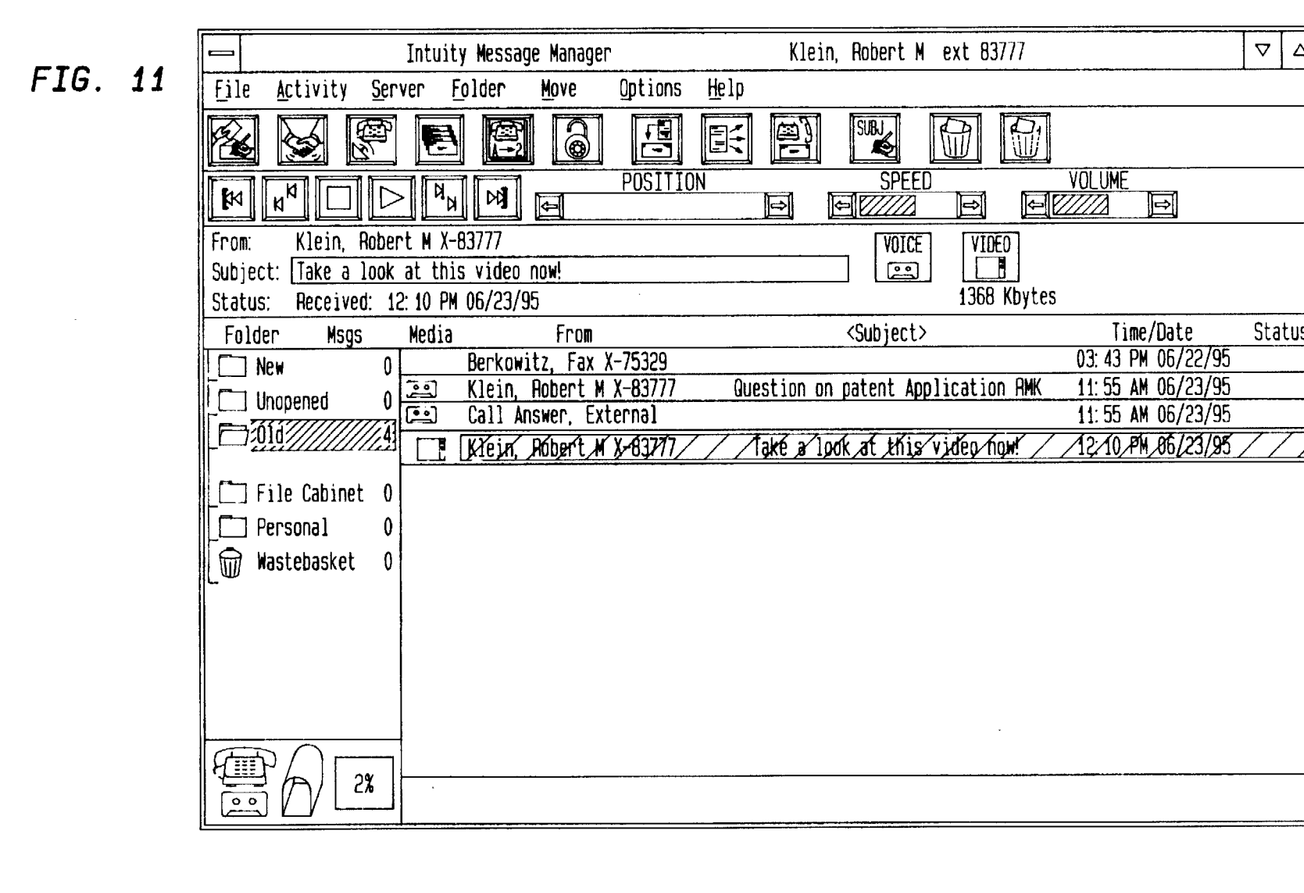
FIGS. 11–13 illustrate the messaging graphical user interface of a workstation of the system of FIG. 1.
Figure 12:
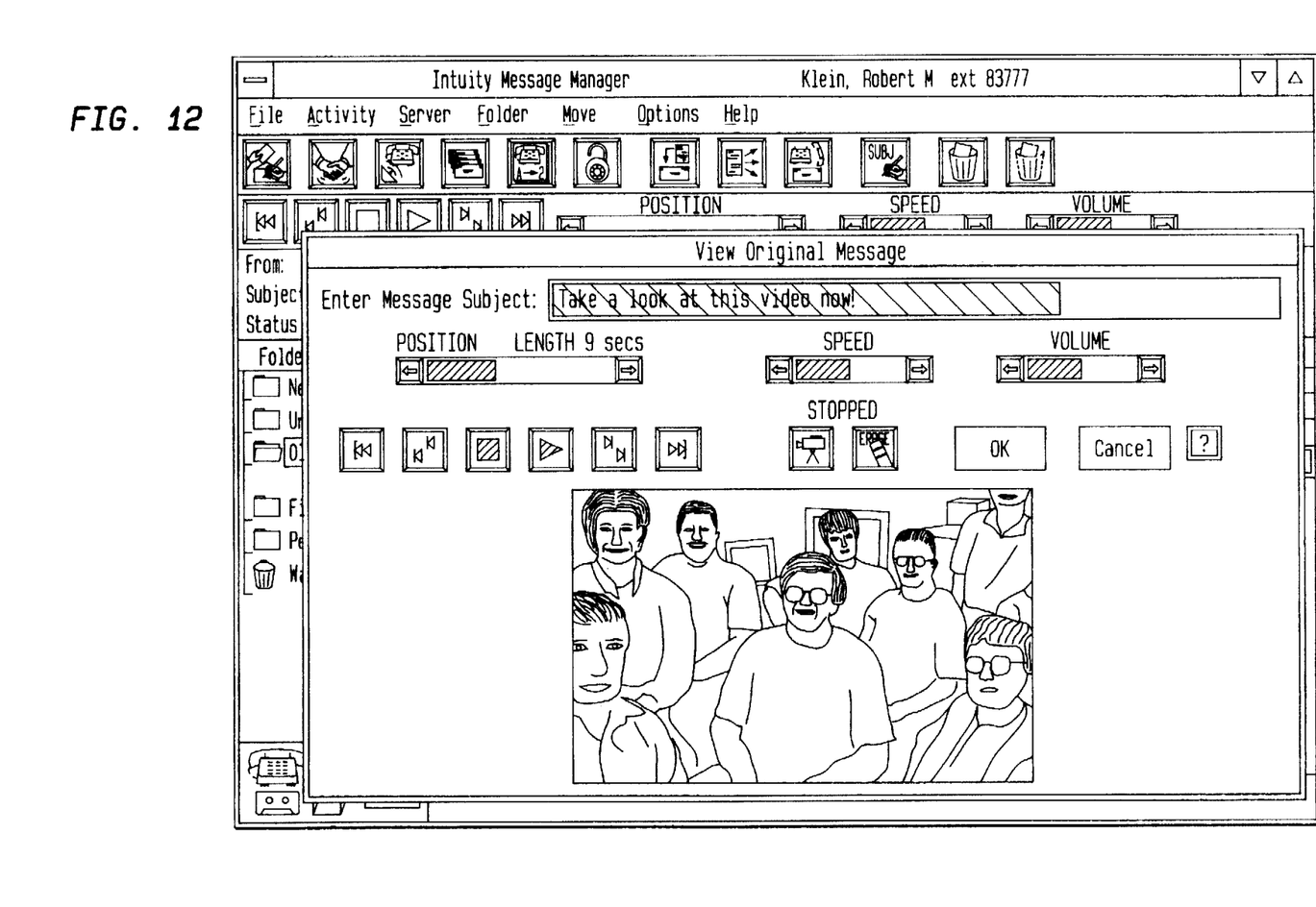
Figure 13:
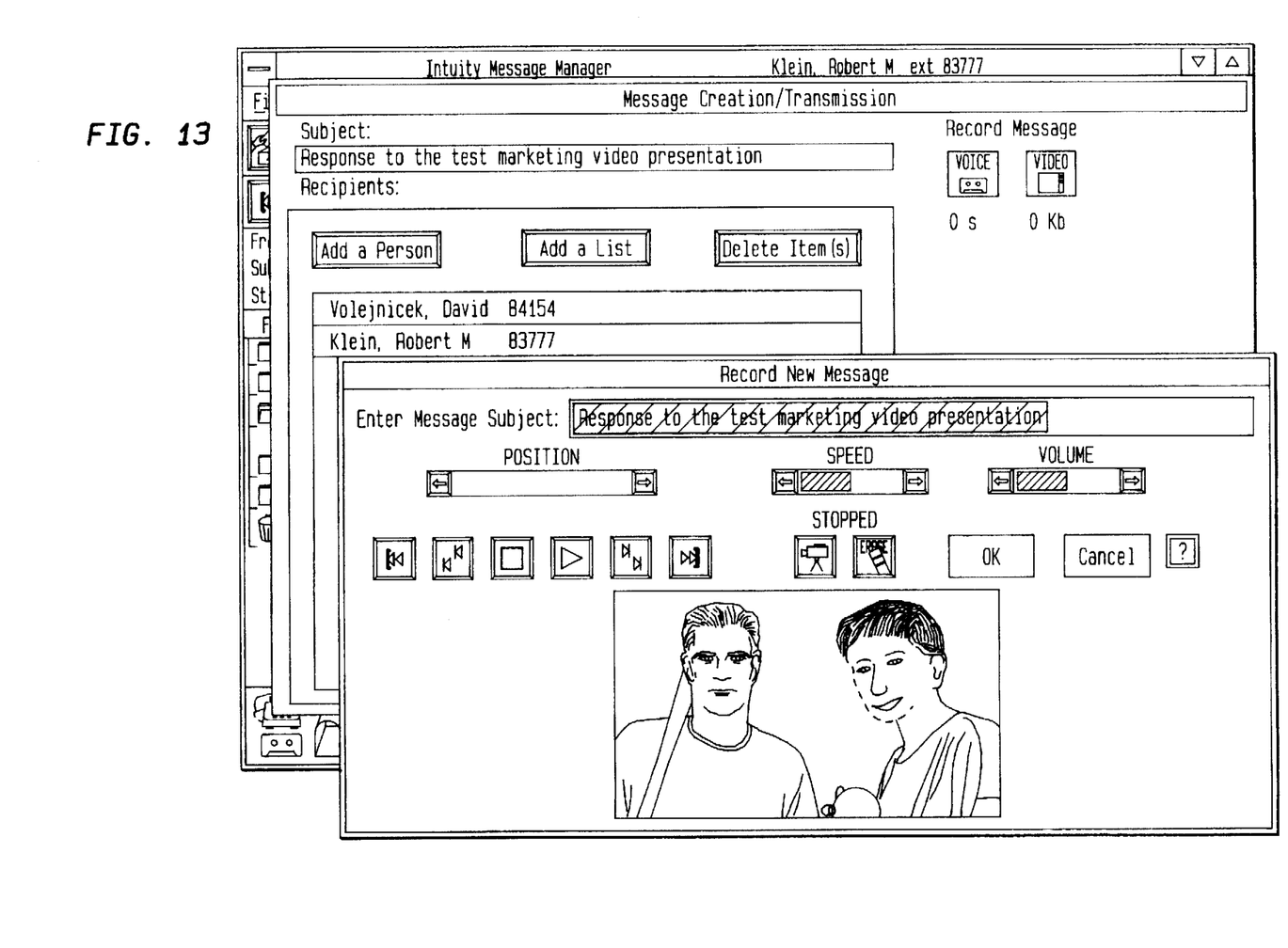

FIGS. 11-13 illustrate the interface that the Intuity Message Manager presents to the user. FIG. 11 shows message retrieval. FIG. 12 shows message playback. And FIG. 13 shows mail-message creation.

The software of video workstations 103-104 further includes a video call answer agent (VCAA) 143 which interacts with ISDN port 136 to answer video calls incoming over the respective one of ISDN lines 153-154 that are not answered by the users of video workstations 103-104. VCAA 143 implements in software an answering machine for video calls at workstations 103-104.

Finally, the software of video workstations 103-104 includes a video control application program interface (VCAPI) 142. VCAPI 142 implements the ability to record video from camera 132 or ISDN line 153 into a file in memory 137 and to play video from a file in memory 137 on display 130 or ISDN line 153. VCAPI 142 is illustratively either the Lotus ScreenCam multimedia screen and sound capture utility, or the AT&T Vistium software developer kit, or the Insoft Communique! developer's toolkit.

Figure 3:
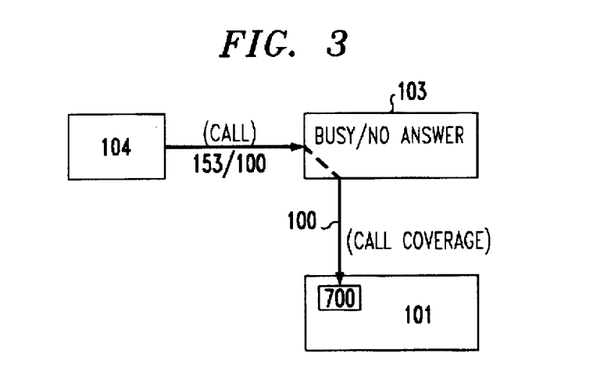
FIG. 3 is a block diagram of a call-answer scenario of the system of FIG. 1.
Figure 4:
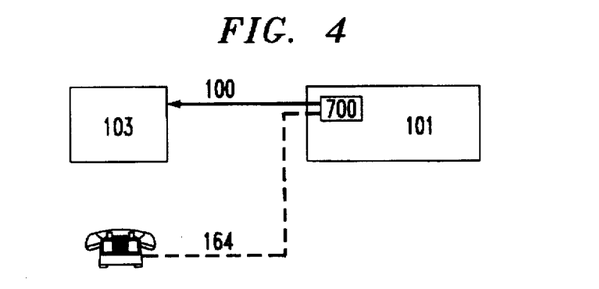
FIG. 4 is a block diagram of a message-retrieval scenario of the system of FIG. 1.
Figure 5:
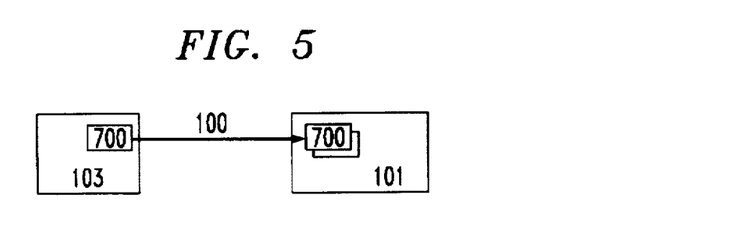
FIG. 5 is a block diagram of a mail-message scenario of the system of FIG. 1.

Configured as described above, the telecommunications system of FIG. 1 enables messaging system 101 to provide video messaging services for video workstations 103-104. Specifically, it enables messaging system 101 to support the call scenarios of FIGS. 3-5. FIG. 3 shows an illustrative call-answer scenario. A video call from video workstation 104 comes to video workstation 103 over ISDN line 153 or LAN 100, and the call either gets a busy indication or is not answered by the user of workstation 103 within a predetermined time. Workstation 103 provides call coverage for the user. It answers the call, records a video message, and sends the recorded message to MMMS 101 for storage in the user's mailbox. FIG. 4 shows an illustrative message-retrieval scenario. When a video message is stored in the mailbox of the user of workstation 103 in MMMS 101, the user can use workstation 103 to access MMMS 101 via LAN 100, retrieve the message, and view it on workstation 103. Or, the user can access MMMS 101 by telephone over a telephone line 169 and retrieve the video message's header and non-video components. FIG. 5 shows an illustrative mail-message scenario. The user of workstation 103 can create a video message on workstation 103 and then transfer it via LAN 100 to MMMS 101 and cause MMMS 101 to store copies of the message in one or more mailboxes.

The call-answer scenario is effected in the manner shown in FIG. 6 and described below. References below to software performing certain functions will be understood to mean a processor performing those functions in response to executing the named software.

When a call incoming either on LAN 100 or on ISDN line 153 is answered, it is handled in the conventional manner by application software of video workstation 103. However, when the call is not answered by the user of video workstation 103 within a predetermined period of time, execution of VCAA 143 is invoked, at step 300. VCAA 143 invokes MMAPI 140 to access messaging system 101 and interact through AIS 116 with ADATA 117 to cause ADATA 117 to return the personal greeting that is stored in mailbox 120 of the user of video workstation 103, at step 302. MMAPI 140 stores the returned personal greeting in a temporary file in memory 137, at step 304. VCAA 143 then answers the call on ISDN line 153 or LAN 100, at step 306. VCAA 143 invokes VCAPI 142 to play out the personal greeting from the temporary file onto ISDN line 153 through ISDN port 136 or onto LAN 100 through LAN interface 134, at step 308. VCAA 143 then waits for the caller to either hang up the call or to record a message, at step 310. If the caller hangs up, execution of VCAA 143 ends, at step 312. If the user chooses to record a message, VCAA 143 stores information about the call, such as date, time, and caller identification, at step 314, and invokes VCAPI 142 to record and store the message in a temporary file in memory 137, at step 316. When the caller completes recording and hangs up, VCAPI 142 reports additional information about the message, such as its length and what media components it includes, to VCAA 143, at step 318. VCAA 143 again invokes MMAPI 140 to access messaging system 101 and interact through AIS 116 with ADATA 117 to create a header for the message in mailbox 120 from the information stored about the call and message by VCAA 143 at step 320. VCAA 143 further causes MMAPI 140 to interact through AIS 116 with ADATA 117 to transfer the message from the temporary file in memory 137 into mailbox 120, at step 322. Execution of VCAA 143 then ends, at step 324.

If MMAPI 140 is the Audix MAPI or Intuity MAPI, a file transfer from video workstation 103 to messaging system 101 is normally accomplished using the AMAPI or IMAPI "Put" command, which effects the transfer in individual 8-kilobyte chunks over LAN 100. Since video files tend to be large, their transfer can take many individual 8-kilobyte transfers and adversely affect the performance of AIS 116. To alleviate this problem, the AMAPI or IMAPI is enhanced to provide a "Put large" command for transferring large files.

Figure 7:
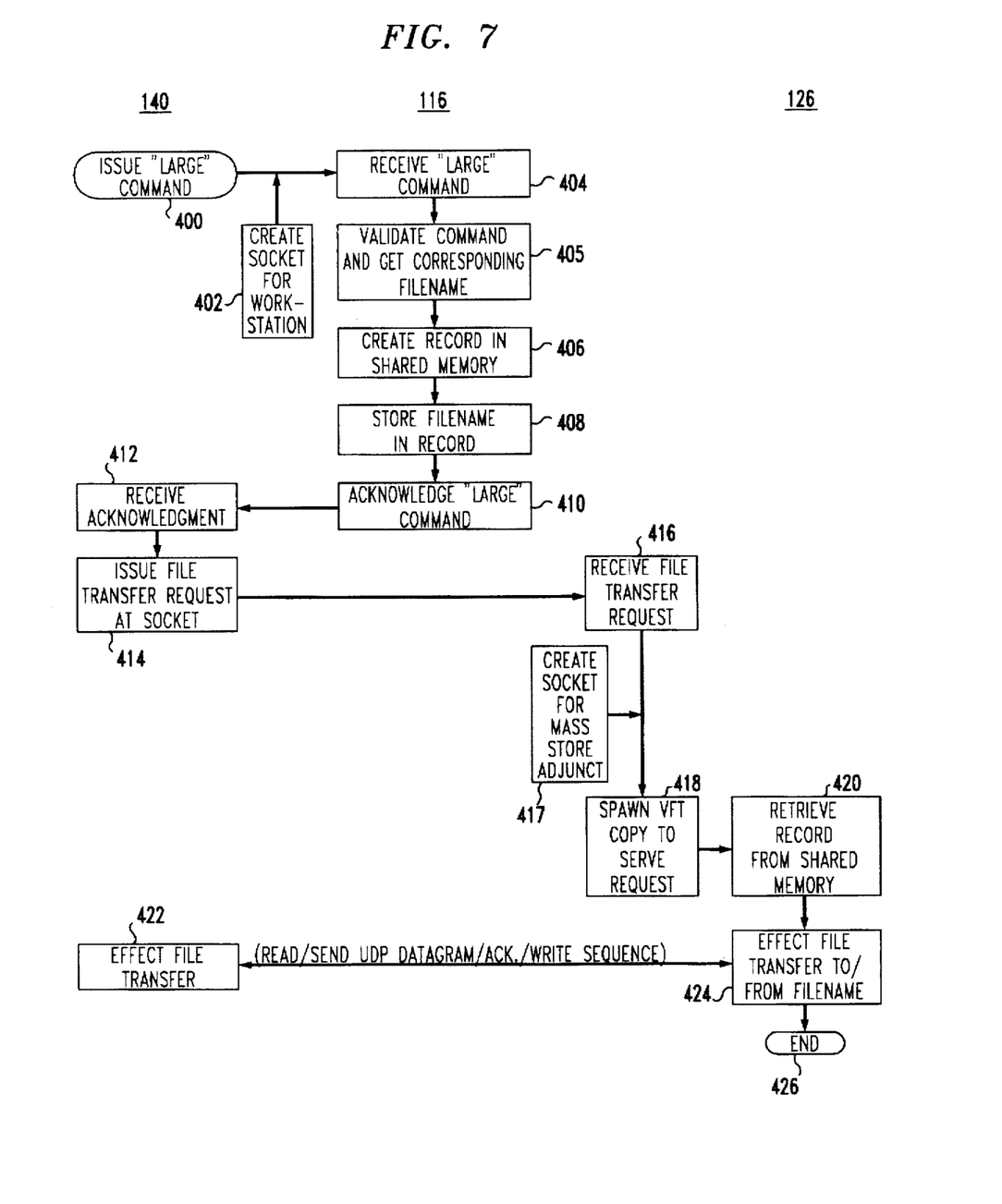
FIG. 7 is a flow diagram of the operations involved in "Put large" and "Get large" commands in the system of FIG. 1.

The "Put large" command is diagrammed in FIG. 7. It relies upon the standard socket (logical port) mechanism of the TCP/IP UDP datagram protocol. When MMAPI 140 issues the "Put large" command for the first time, at step 400, the UDP mechanism creates a socket for video workstation 103 on LAN 100, at step 402. This socket is then reused for all subsequent "large" commands issued by MMAPI 140. The command issued at step 400 includes the socket's address, and a message ID of the video file. AIS 116 receives the "Put large" command, at step 404, and in response validates the request and gets a filename that corresponds to the received message ID from ADATA 117, at step 405. AIS 116 then creates a record in shared memory (a portion of memory 113 that is accessible to, and hence is shared with, processor 123 of mass store 102), at step 406, in which it stores the address of the socket of workstation 103 and the filename of a file in mass memory 122 which it obtained from ADATA 117, at step 408. AIS 116 then sends an acknowledgment of the "Put large" command to MMAPI 140, at step 410, that conveys to MMAPI 140 the record index of the record created at step 406. MMAPI 140 receives the acknowledgement, at step 412, and in response, it makes a standard TCP/IP Internet service request containing the record index at the socket of workstation 103 on LAN 100, at step 414. The request is received by the standard RPC "Bind" process of the UNIX operating system of mass store 102, at step 416. If this is the first time that such a request has been received, the RPC mechanism creates a socket for mass store adjunct 102 on LAN 100, at step 417. This socket is then reused for all subsequent requests. In response to receipt of the request, processor 123 creates ("spawns") a copy of VFT 126 to serve the request, at step 418.

The copy of VFT 126 uses the record index to access the record in the shared memory portion of memory 113 and retrieves from the record the address of the workstation 103 socket and the filename, at step 420. The copy of VFT 126 then interacts with MMAPI 140 through the sockets of video workstation 103 and mass store adjunct 102 in a sequence of repeated reads, writes, and acknowledgments of data, using standard TCP/IP UDP datagrams, until an end-of-file is encountered, to effect the file transfer between workstation 103 and mass store adjunct 102, and stores the file in mass memory 122 under the filename designated by AIS 116 in the retrieved record, at steps 422 and 424. When the file transfer is completed, the copy of VFT 126 that was created to accomplish this transfer is destroyed, at step 426.

Figure 6:
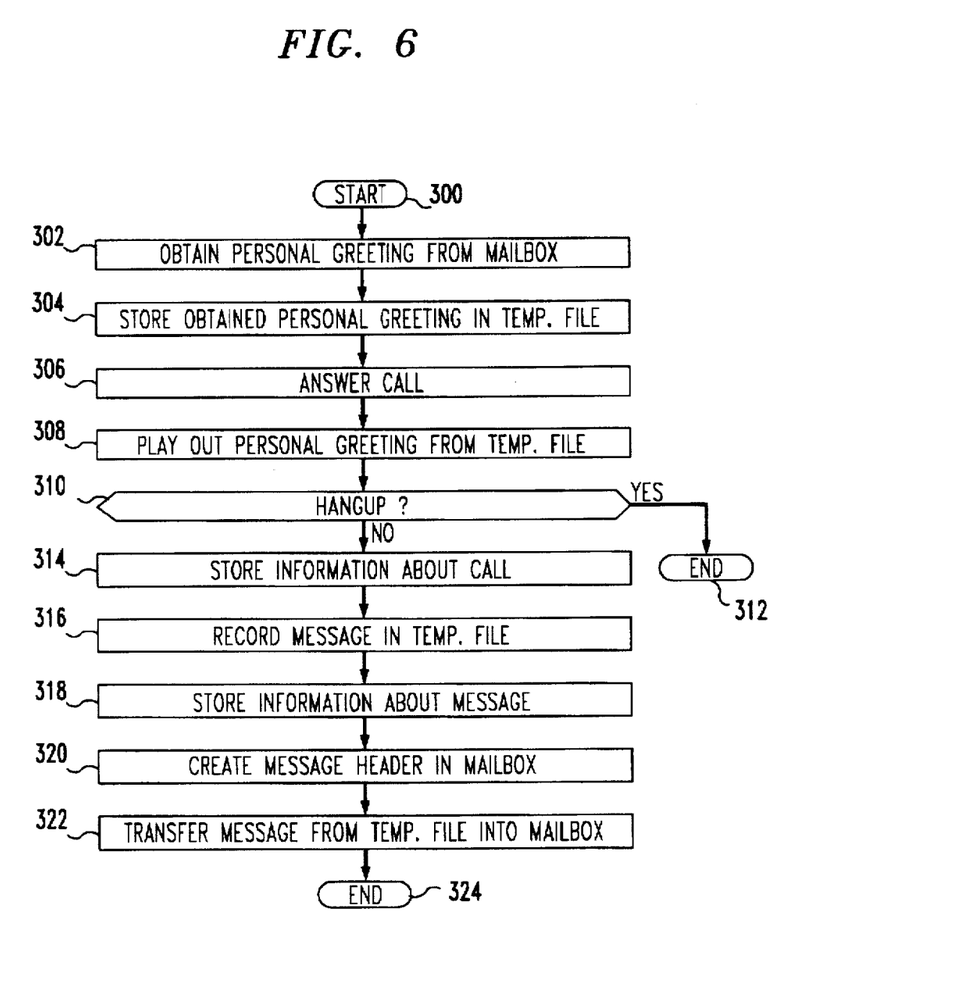
FIG. 6 is a flow diagram of operations of a workstation of the system of FIG. 1 involved in the call-answer scenario of FIG. 3.

With the "Put large" command available to it, MMAPI 140 uses the "Put" command to transfer the message header information and the non-video portions of the message to messaging system 101, at steps 320 and 322 of FIG. 6, and uses the "Put large" command to transfer the video portion of the message to MMMS 101 or mass store 102, at step 322 of FIG. 6.

Once the message is stored either in its entirety in messaging system 101, or partly in messaging system 101 and partly in mass store 102, the subscriber/owner of mailbox 120 has conventional access to all parts of the message, except for the video object, via telephone lines 164 and any instrumentalities (e.g. telephones, terminals) associated therewith. To gain access to the video object of the message, the subscriber must use video workstation 103. The subscriber can also access the entire message through video workstation 103.

Figure 8:
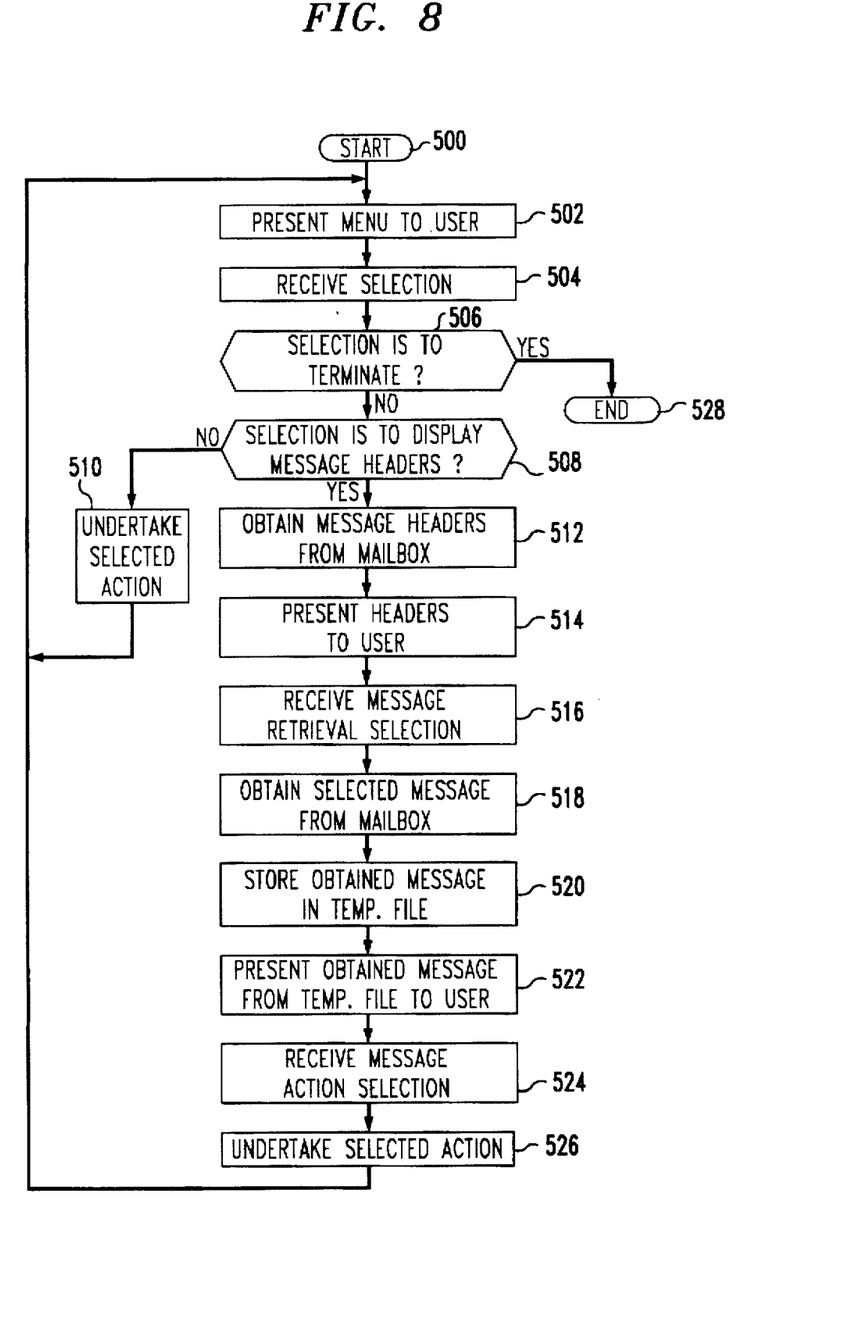
FIG. 8 is a flow diagram of operations of a workstation of the system of FIG. 1 involved in the message-retrieval scenario of FIG. 4.

To obtain access to his or her mailbox 120 at video workstation 103, the subscriber/owner of mailbox 120 invokes execution of MM 141, at step 500 of FIG. 8. MM 141 responds by presenting a user menu to the subscriber on the display screen of video workstation 103, at step 502. The subscriber makes a selection from the menu and MM 141 receives it, at step 504, and checks whether it is a request to terminate execution of MM 141, at step 506. If so, MM 141 proceeds to step 528 to terminate; if not, MM 141 checks whether the request is to display message headers waiting for retrieval in the subscriber's mailbox or some other request, at step 508. If it is some other request, MM 141 undertakes to perform the selected action in a conventional manner, at step 510, and then returns to step 502. If the request is a request to display message headers, MM 141 invokes MMAPI 140 to access messaging system 101 and interact through AIS 116 with ADATA 117 to cause ADATA 117 to return the headers of messages stored in mailbox 120, at step 512. MM 141 then presents the headers to the user via display 130, at step 514. If the user decides to retrieve one of the messages 120 and so indicates to MM 141, at step 516, MM 141 responds by again invoking MMAPI 140 to access messaging system 101 and interacting through AIS 116 with ADATA 117 to retrieve the message body components from mailbox 120, at step 518, and stores them in a temporary file in memory 137, at step 520. If the message includes a video component, MM 141 invokes VCAPI 137 to present (play) the video component to the user through display 130 and speakers 131, at step 522. If the user decides to act upon the message in some way, such as to forward it to another user's mailbox 121 or to delete it from mailbox 120, the user informs MM 141, at step 524, and MM 141 responds by invoking MMAPI 140 to interact through AIS 116 with ADATA 117 to cause ADATA 117 to undertake the desired action, at step 526. MM 141 then returns to step 502.

If MMAPI 140 is the Audix MAPI or Intuity MAPI, a file transfer from messaging system 101 is normally accomplished using the AMAPI or IMAPI "Get" command which, like the above-described "Put" command, effects the transfer in individual 8-kilobyte chunks, with the same deleterious affect on the performance of AIS 116. To alleviate this problem, the AMAPI or IMAPI is enhanced to provide a "Get large" command for transferring large files. Except for the direction of file transfer, the "Get large" command works the same way as the "Put large" command, and hence is also diagrammed in FIG. 7 and described by the accompanying description.

Figure 9:
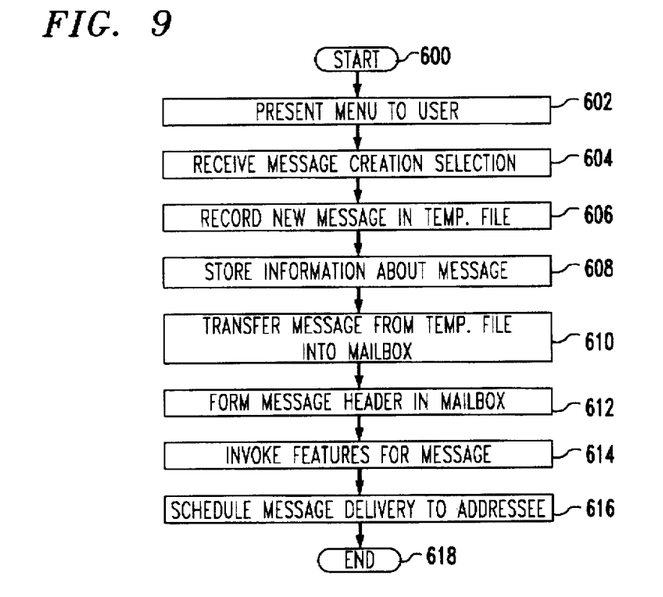
FIG. 9 is a flow diagram of operations of a workstation of the system of FIG. 1 involved in the mail-message scenario of FIG. 5.

The user of workstation 103 can also create a mail message in his or her mailbox 120 and then send it to a mailbox 121 of another user. To do so, the user of workstation 103 invokes MM 141, at step 600 of FIG. 9, and selects message creation, at step 604, from the user menu presented by MM 141 at step 602. In response, MM 141 invokes VCAPI 142 to record the user's message, using camera 132 and microphone 133, into a temporary file in memory 137, at step 606. When the recording is completed, VCAPI 142 gives information about the message, such as its length and what media objects it contains, to MM 141, at step 608, and exits. MM 141 now invokes MMAPI 140 to access messaging system 101 and interact through AIS 116 with ADATA 117 to transfer the message from the temporary file in memory 137 into mailbox 120, at step 610. If the message has a video object, "Put large" is used to accomplish the transfer, in the manner described previously. MM 141 also uses MMAPI 140 to interact through AIS 116 with ADATA 117 to create a header for the message, step 612, to invoke any desired features for the message (e.g., "make private" or "priority"), at step 614, and to address the message and schedule it for delivery, at step 616. The user may then terminate MM 141 at the user's option, at step 618.

A drawback of the implementation illustrated in FIG. 1 is that it does not readily allow for a caller who has reached either a powered-down or a busy video workstation 103-104, or who has called a video workstation that is disconnected from the system of FIG. 1. A way to implement this capability is to designate at least one of the workstations 103-104 to act as a messaging server (essentially an answering machine) on behalf of other workstations in the system of FIG. 1, and to redirect to it all calls that go unanswered at the destination workstations 103-104 for longer than a predetermined amount of time. In the case of calls incoming on ISDN lines 153-154, such redirection may be accomplished by a switching system with video-call redirection capability—such as an AT&T 5ESS® switching system—that is a part of network 170. In the case of calls incoming on LAN 100, such redirection may be accomplished by the server workstation itself monitoring all call-origination traffic on LAN 100 and taking on itself the identity, with respect to LAN 100, of any non-answering workstation.

Figure 10:
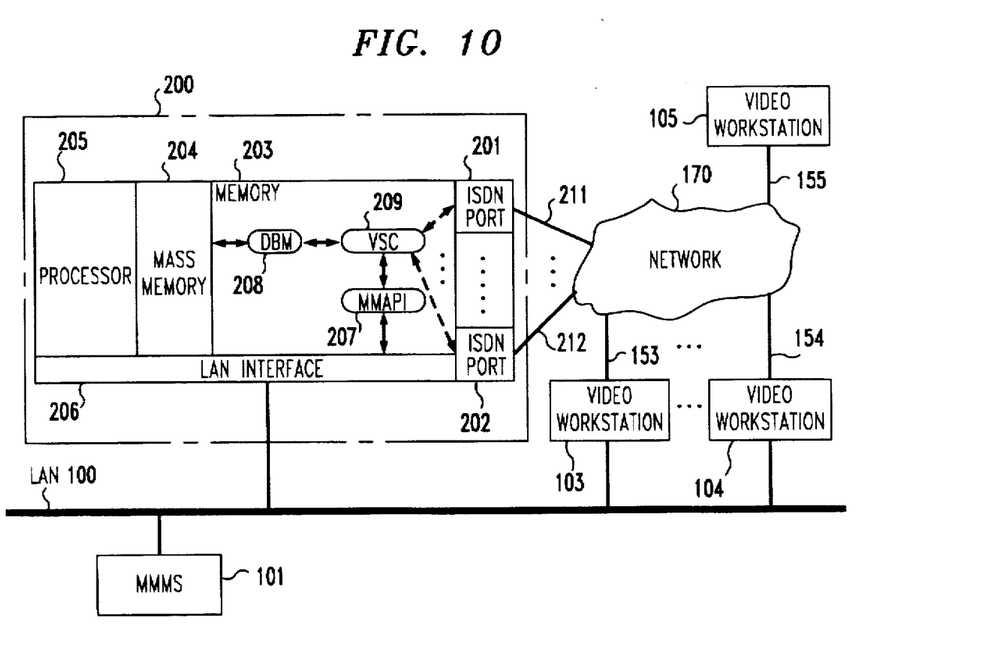
FIG. 10 is a block diagram of a telecommunications system which includes a second illustrative embodiment of the invention.

Instead of using a plurality of video workstations as servers, an alternative embodiment is shown in FIG. 10. Here, a video call server 200 is added to the system of FIG. 1. (Elements in FIG. 10 that are the same as in FIG. 1 retain the same numerical designations as in FIG. 1). Video call server 200 is a stored-program-controlled machine that includes a processor 205 for executing programs, a memory 203 that stores programs for execution and data for use by processor 205, and a mass memory 204 for storing video messages. Mass memory 204 serves the function of adjunct mass store 102 of FIG. 1, and hence adjunct mass store 102 is not needed in the system of FIG. 6. Video call server 200 includes database manager (DBM) 208 software that implements NFS connectivity between messaging system 101 and mass memory 204 to turn mass memory 204 into an extension of mass memory 111. Illustratively, DBM 208 need involve no more than the conventional database management functions of the UNIX operating system kernel (i.e., the basic UNIX file system read/write/directory access functionality). Video call server 200 includes a plurality of ISDN ports 201-202, each one of which is an equivalent of ISDN port 136 of video workstation 103. ISDN ports 201-202 are connected by respective ISDN lines 211-212 to network 170 that includes a switching system with video call-redirection capability. Video call server 200 is connected to LAN 100 by a LAN interface 206 that is an equivalent of LAN interface 110 of messaging system 101. For communicating with messaging system 101, video call server includes MMAPI 207 that is an equivalent of MMAPI 140.

Video call server 200 answers all calls that are not answered at workstations 103-104 within a predetermined period of time. Hence, workstations 103-104 no longer need VCAA 103. For this purpose, video call server 200 includes a video session controller (VSC) 209. Functionally, VSC 209 is equivalent to multiple copies of VCAA 143 and VCAPI 142, whereby multiple ports 201-202 may be served at the same time.

Of course, various changes, modifications, and extensions to the illustrative embodiment described above will be apparent to those skilled in the art. For example, network 170 may be an ATM network instead of an ISDN network. Such changes and modifications can be made without departing from the spirit and the scope of the invention and without diminishing its attendant advantages. It is therefore intended that such changes and modifications be covered by the following claims.

The invention claimed is:

1. A video messaging system comprising:
   a video communications network;
   at least one telephone line;
   a multi-media message server for storing messages having a plurality of message portions at least some of which message portions may be represented in any one of a plurality of different media, the multi-media message server comprising
   first interface means connected to the at least one telephone line for providing access over the at least one telephone line to at least some portions of the messages stored in the multi-media message server, and
   second interface means connected to the video communications network for receiving via the video communications network video messages having portions represented in a video medium and storing the received video messages in the multi-media message server, and for retrieving the stored video messages and transmitting the retrieved video messages via the video communications network;

one or more video communications terminals connected to the video communications network, wherein at least a first one of the video communications terminals includes third means responsive to a video communication incoming to the at least first one of the video communications terminals and not answered by a recipient of the video communication, for answering the incoming video communication and recording from the video communication a video message having a portion represented in the video medium, and fourth means responsive to the third means recording the video message, for transmitting the recorded video message via the video communications network to the multi-media message server, and causing the second interface means to receive and store the transmitted video message in the message server, and wherein at least a second one of the video communications terminals includes fifth means for causing the second interface means to retrieve and transmit the stored video message, and receiving the video message transmitted from the multi-media message server via the video communications network for presentation of the received video message to a user of the at least second one of the video communications terminals.

2. The video messaging system of claim 1 further comprising:

at least one video communications line independent of the video communications network and connected to at least the first one of the video communications terminals; wherein the third means are responsive to the video communication incoming to the at least first one video communications terminal on the at least one video communications line, and answer the incoming video communication on the at least one video communications line.

3. The video messaging system of claim 1 wherein:

the third means are responsive to the video communication incoming to the at least first one video communication terminal on the video communications network, and answer the incoming video communication on the at least one video communications network.

4. The video messaging system of claim 1 wherein:

the video communications network is one of a LAN and a WAN.

5. The video messaging system of claim 4 wherein:

the second interface means and the fourth means communicate with each other over the LAN or WAN via TCP/IP UDPs and TCP/IP RPCs.

6. The video messaging system of claim 1 wherein:

the multi-media message server comprises first mass memory means for storing some of the portions of the messages that are stored by the multi-media message server, connected to the first and the second interface means without intermediacy of the video communications network, and second mass memory means serving as an extension of the first memory means for storing others of the portions of at least some of the messages that are stored by the multi-media message server, the second mass memory means being connected to the first mass memory means and to the first and the second interface means via the video communications network.

7. The video messaging system of claim 6 wherein:

the first mass memory means store the portions of the messages that are stored by the multi-media message server other than the portions represented in the video medium, and the second mass memory means store those portions of the messages that are stored by the multi-media message server that are represented in the video medium.

8. The video messaging system of claim 7 wherein:

the fourth means communicate the portions of the messages that are stored by the first mass memory means of the multi-media message server to or from the second interface means, and communicate the portions of the messages that are stored by the second mass memory means of the multi-media message server to or from the second mass memory means without intermediacy of the second interface means.

9. The video messaging system of claim 1 wherein:

the third means include a memory;

means responsive to the incoming video communication for answering the video communication;

means responsive to the answering, for recording the video message from the answered video communication into a file in the memory; and the fourth means include means responsive to the recording, for transferring the file from the memory via the video communications network to the multi-media message server.

10. The video messaging system of claim 9 wherein:

the fifth means include a display screen;

a memory;

means responsive to a user request, for transferring a file containing the video message from the multi-media message server and storing it in a file in the memory; and means for playing the video message from the file on the display screen.

11. A video message server for use with at least one telephone line, a video communications network, and one or more video communications terminals connected to the video communications network, at least a first one of which video communications terminals generates messages each having a plurality of message portions at least one of which message portions is represented in a video medium, and transmits the messages on the video communications network, and at least a second one of which video communications terminals receives video messages from the video communications network for presentation to users, the video message server comprising:

means for storing messages each having a plurality of message portions at least one of which message portions may be represented in any one of a plurality of different media including the video medium;

first interface means for connecting the video message server to the at least one telephone line to provide access over the at least one telephone line to at least some portions other than portions represented in the video medium of the messages stored in the storing means; and second interface means for connecting the video message server to the video communications network, responsive to receipt via the video communications network from the first video communications terminal of a video message generated by the first video communications terminal from a video communication not answered by an intended recipient of the video communication and received and answered by the first video communications terminal, for storing the received video message in the storing means, and further responsive to receipt of a request from the second video communications terminal, for retrieving a stored video message from the storing means and transmitting the retrieved message to the second video communications terminal over the video communications network for presentation of the retrieved message by the second video communications terminal to a user.

12. A video communications terminal for use with a video communications network, at least one telephone line, and a multi-media message server for storing messages having a plurality of message portions at least some of which message portions may be represented in any one of a plurality of different media, the multi-media message server including a first interface connected to the at least one telephone line for providing access over the at least one telephone line to at least some portions of the messages stored in the multi-media message server, and a second interface connected to the video communications network for receiving via the video communications network video messages having portions represented in a video medium and storing the received video messages in the multi-media message server, and for retrieving the stored video messages and transmitting the retrieved video messages via the video communications network, the video communications terminal comprising:

first means responsive to a video communication incoming to the video communications terminal and not answered by a recipient of the video communication, for answering the incoming video communication and recording from the video communication a video message having a portion represented in the video medium;

second means for connecting to the video communications network and responsive to the first means recording the video message, for transmitting the recorded video message via the video communications network to the multi-media message server and causing the second interface to receive and store the transmitted video message in the message server such that access to at least some portions other than the portions represented in the video medium of the video message stored in the message server is provided over the at least one telephone line through the first interface;

third means responsive to a request received from a user of the video communications terminal, for causing the second interface to retrieve and transmit the stored video message on the video communications network, and receiving the video message transmitted from the multi-media message server via the video communications network; and fourth means responsive to the receipt of the video message by the third means for playing the received video message to the user of the video communications terminal.

\* \* \* \* \*